June 7, 1949.  V. V. PRICE  2,472,438
SWINGING AND ROTATING REFLECTING
DEVICE FOR MOTOR VEHICLES
Filed April 11, 1947  3 Sheets-Sheet 1

Inventor
Voris V. Price,
By McMorrow, Berman & Davidson
Attorneys

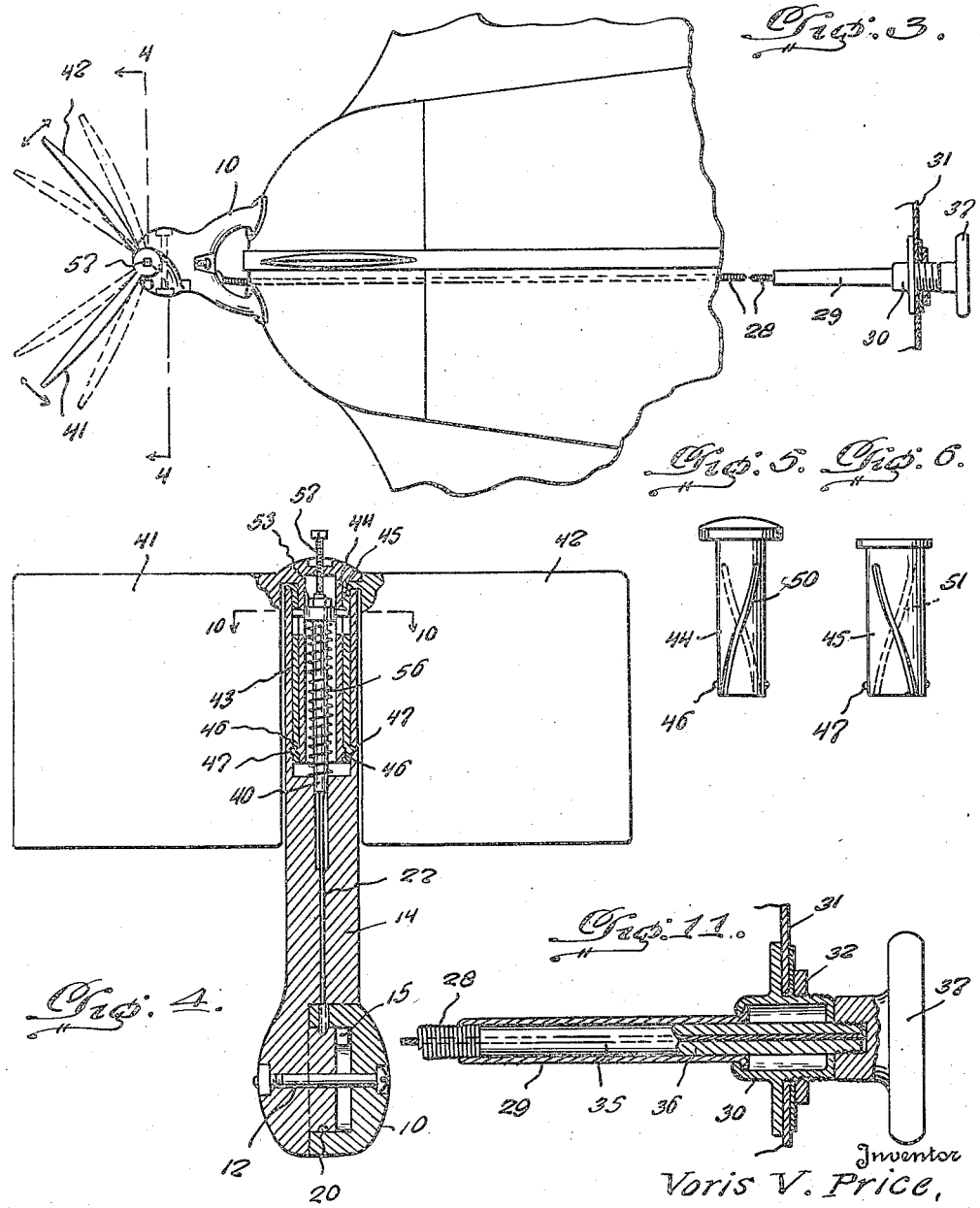

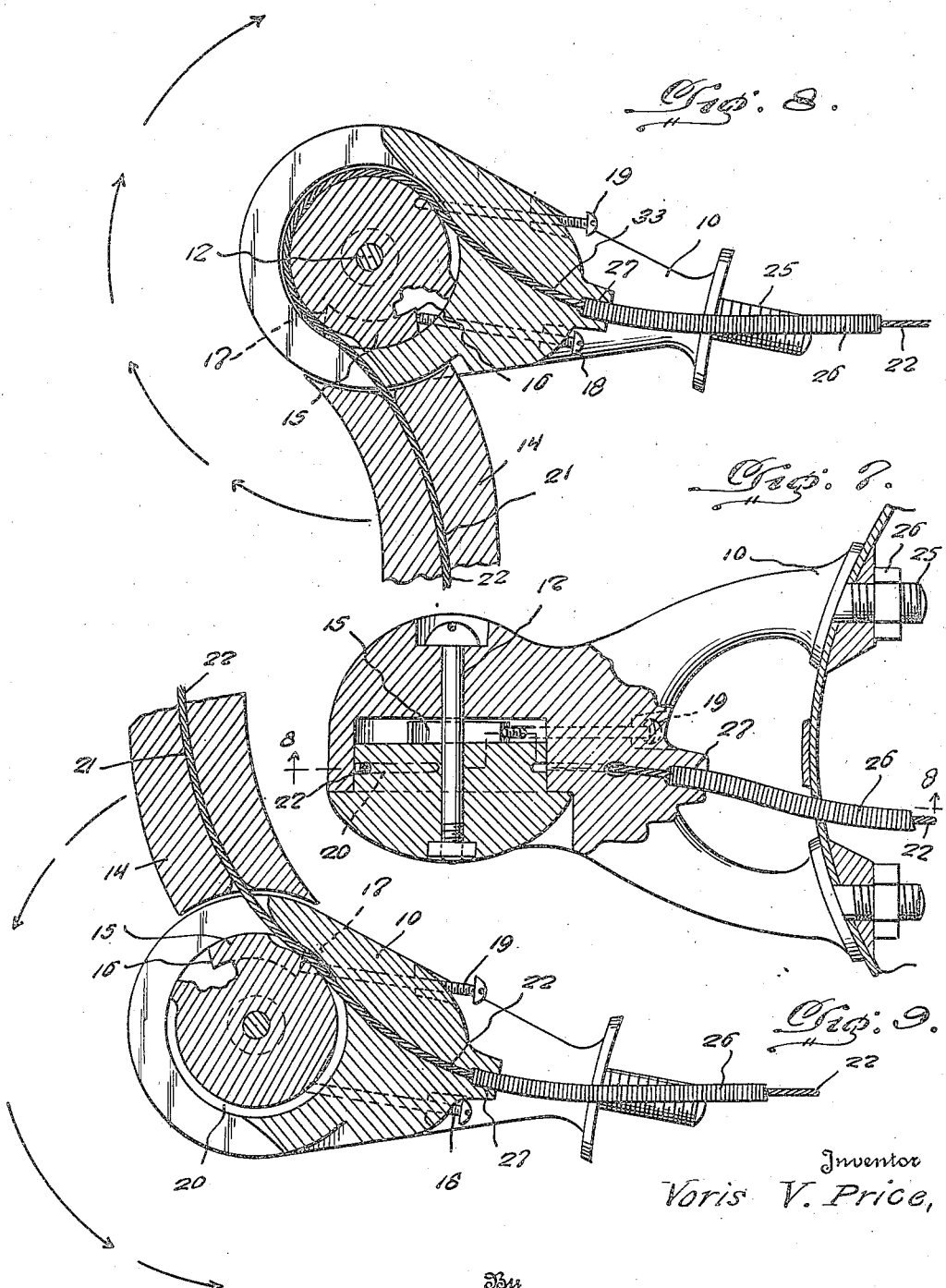

Patented June 7, 1949

2,472,438

UNITED STATES PATENT OFFICE 2,472,438

SWINGING AND ROTATING REFLECTING DEVICE FOR MOTOR VEHICLES

Voris V. Price, Brazil, Ind.

Application April 11, 1947, Serial No. 740,866

5 Claims. (Cl. 88—98)

1

This invention relates to a reflecting device for motor vehicles, the principal object of the invention being to provide means whereby the driver of a vehicle will be warned of the approach of other vehicles on intersecting roads and on curves.

To this end, the invention comprises a bracket mounted at the front of the hood, the bracket supporting a pair of mirrors, and means under control of a driver of a vehicle for swinging the bracket into operative position and for adjusting the mirrors to various angles.

The invention will be more clearly understood by the aid of the accompanying drawings, forming part of this specification, these drawings illustrating a preferred embodiment of the invention. It is to be understood, however, that various changes and modifications may be made in the construction of the invention without departing from the spirit thereof.

In the drawings,

Figure 3 is a top plan view of the device shown in operative position.

Figure 4 is a transverse vertical section taken along the line 4—4 of Figure 3.

Figure 5 and Figure 6 are elevations of a pair of cams for operating the mirrors.

Figure 7 is a horizontal section taken through the axis of the swinging bracket.

Figure 8 is a vertical section taken along the line 8—8 of Figure 7, with the bracket in retracted position.

Figure 9 is a section similar to Figure 8, but showing the bracket in extended position.

Figure 11 is a horizontal section through the operating lever with which the driver of a vehicle may operate the reflecting device.

Figure 1:
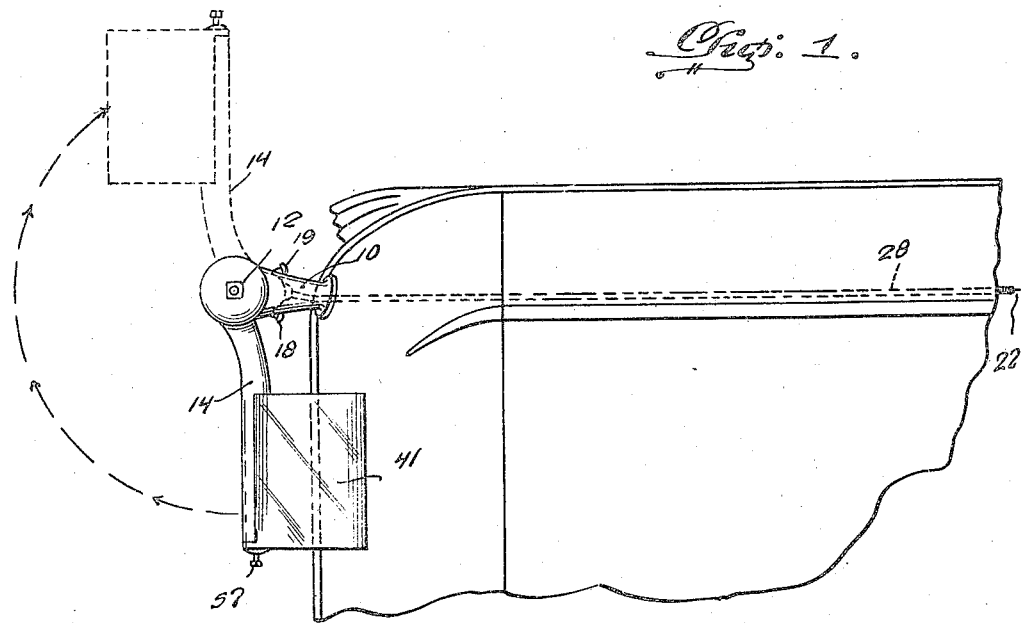
Figure 1 represents a side elevation of the hood of a motor vehicle, with the reflecting device attached thereto, the alternative or operative position of the reflecting device being shown in dotted outline.
Figure 2:
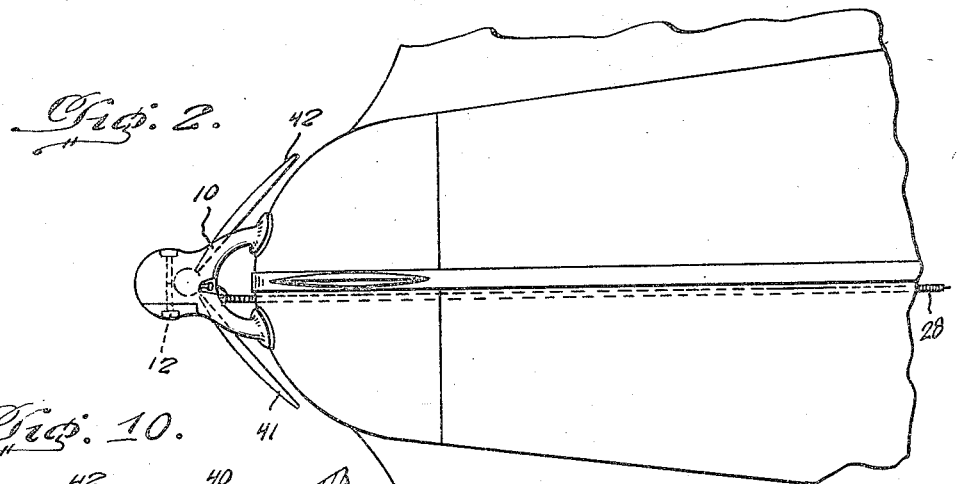
Figure 2 is a top plan view of the structure shown in Figure 1.

The new and improved reflecting means comprises a bifurcated bracket adapted to be fixed to the top portion of the front of an automobile hood, as shown most clearly in Figures 1, 2, and 3. The bracket 10 is apertured to receive a horizontal pivot pin 12. A curved arm 14 is mounted for swinging movement on the pivot pin 12, so that in retracted position it will lie adjacent the front of the hood and in operative position can be swung about the horizontal pivot 12 to project

2 above the top of the hood, as shown in Figure 1. The pivoted end of the arm 14 is received within an appropriate slot in the bracket 10, and is formed with a projection 15 having two bearing surfaces 16 and 17. The bracket 10 is provided with two adjusting screws 18 and 19, one adjusting screw 18 being adapted to engage the bearing surface 16 of the arm 14 when the latter is in retracted position, and the adjusting screw 19 being adapted to bear against the surface 17 of the arm 14 in the upright position. It will be seen, therefore, that the adjusting screws 18 and 19 act as stops to limit the travel of the arm 14.

The pivoted end of the arm 14 is rounded, and is further provided with a substantially annular groove 20. The central portion of the arm 14 is provided with a longitudinal passageway 21, and a cable 22 is looped around the annular groove 20 and through the passageway 21 in the arm 14, for a purpose to be described more fully hereinafter.

The birfurcated bracket 10 may be secured to the hood by means of bolts 25 and nuts 25', the bolts 25 passing through suitable apertures in the hood. The hood has an additional aperture through which a long tube 26 is adapted to pass. The anterior end 27 of the tube 26 is fastened to the bracket 10, and the other end 28 of the tube is gripped to a hollow sleeve 29, the rear end of which is secured to a union 30 that passes through the dashboard 31 of the motor vehicle. The union 30 bears against the rear of the dashboard 31, and a threaded nut 32 is screwed on the front portion of the union 30 to fix it in position with relation to the dashboard 31.

The bracket 10 is also provided with a passageway 33 that is tangential to the annular groove 20 on the pivoted end of the arm 14, as indicated most clearly in Figure 8 of the drawings.

The cable 22 extends through the passageway 21 of the arm 14, around the annular groove 20, through the passageway 33 in the bracket 10, and through the tube 26. The rear end 35 of the cable 22 is securely fastened to a holder 36 that is adapted to slide within the sleeve 29 and projects beyond the dashboard 31. A knob 37 is fastened to the holder 36 by threads or other similar means. It will be apparent that a pull on the knob 37 will be communicated to the cable 22.

The front end of the cable 22 is connected with an actuator rod 40, that serves to swing two mirrors 41 and 42 into and out of operative position. These mirrors 41 and 42 may be made of any suitable material, preferably highly polished metal. The end of the arm 14 is recessed to form a hollow cylinder 43, open at the ends. An inner sleeve 44 and an outer sleeve 45 are adapted to nest within the recess 43. The dimensions of the members 43, 44, and 45 are such that any one may turn on their common axis with respect to the others. Axial movement is prevented by annular shoulders 46 and 47 of the sleeves 44 and 45 that fit in cooperating grooves in their contiguous surfaces of the sleeve 45 and the recess 43, respectively.

The mirror 41 may be made integral with the sleeve 44, as shown in Figure 4, or may be made separately therefrom and affixed thereto. The mirror 42 is similarly fastened to or formed with the sleeve 45.

Figure 10:
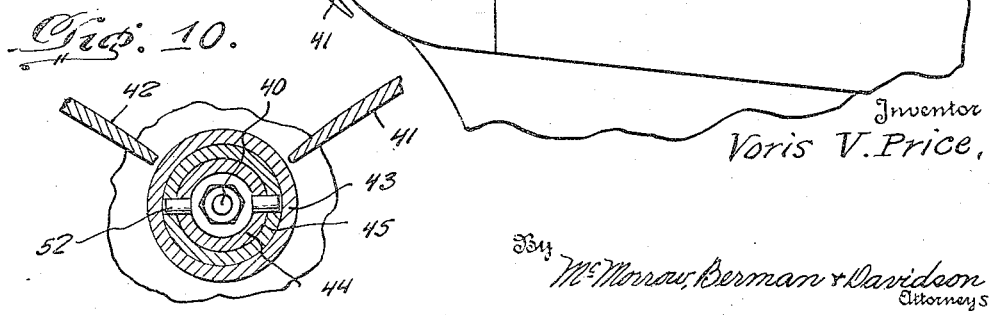
Figure 10 is a horizontal section taken along the line 10—10 of Figure 4.

The sleeve 44 is provided with a diametral slot 50 that extends clear through the sleeve 44 from one surface to the other. This slot 50 is given a twist, so that the surface appears to be helical, as shown more clearly in Figure 5. Of course, any lateral cross-section of the sleeve 44 will show the slot 50 to be straight, as is evident in Figure 10. The sleeve 45 is provided with an exactly similar but opposed slot 51. An actuator pin 52 is secured to the end of the actuator rod 40 by means of a lock nut 53. The pin 52 includes opposite ends extending radially of the rod 40 which are designed to fit in the slots 50 and 51 of the sleeves 44 and 45 and it will be observed that since the sleeves 44 and 45 are prevented from axial movement by means of the shoulders 46 and 47, any axial movement of the pin 52 will result in opposite rotation of the sleeves 44 and 45. A coil spring 56 is positioned between the pin 52 and the bottom of the recess 43, as shown in Figure 4, and an adjusting screw 57 is provided for the purpose of adjusting the tension of the spring 56. The operation of the device is as follows:

When the operator pulls on the knob 37, the cable 22 will exert a tension on the arm 14 to swing the latter about the horizontal pivot 12. The arm 14 will swing clockwise, as viewed in Figure 1, until the bearing surface 17 abuts the screw 19, at which time the arm 14 will be in an upright position. The operator then continues his tension on the cable 22, against the force of the spring 56, thereby pulling the pin 52 downwardly as viewed in Figure 4. The pin 52 will ride in the grooves 50 and 51 in the sleeves 44 and 45, respectively, and thereby rotate the said sleeves 44 and 45. The grooves 50 and 51 are opposed, so that the sleeves 44 and 45 will simultaneously rotate in opposite directions. As this happens the mirrors 41 and 42 will unfold to vary the angles of reflection thereof, their final position being determined by the extent of the tension on the cable 22. Accordingly, the operator can set the mirrors 41 and 42 to serve as rear view mirrors or as intersection mirrors, the angles of reflection depending on the angles of intersection of intersecting streets or roads.

The adjusting screw 57 may adjust the spring 56 to exactly compensate for the forces of friction, so that the mirrors 41 and 42 will stay in any position to which they are pulled by means of the knob 37. Alternatively, the force of the spring 56 may be such as to fold up the mirrors 41 and 42 as soon as the knob 37 is released. In any event, as soon as the mirrors 41 and 42 have been folded, a push on the knob 37 will be communicated by means of the cable 22 to swing the arm 14 downwardly against the hood.

I claim:

1. A device of the class described, comprising an arm adapted to be hinged to the front of a vehicle, a cylindrical recess in the end of the said arm, an inner cylindrical sleeve and an outer cylindrical sleeve adapted to nest within the said recess, each of the said sleeves being provided with a twisted diametral groove, the groove of one sleeve being in an opposed direction to that of the other sleeve, a diametral pin adapted to ride in the grooves of both sleeves, a mirror fixed to each sleeve, and a cable connected to the said pin, whereby a pull on the cable will swing the arm about its pivot and also move the pin to rotate the sleeves and their respective mirrors.

2. A device of the character described, comprising a bracket adapted to be fixed to the front of a vehicle, a horizontal pivot carried by the said bracket, an arm pivoted at one end to the said pivot, means for fixing the limits of travel of the said arm with respect to the said bracket, a cylindrical recess in the free end of the arm, an inner sleeve and an outer sleeve nesting within the said cylindrical recess, a twisted diametral groove in each sleeve, the groove in one sleeve opposing that of the other sleeve, means for constraining the sleeves to rotary motion in the said recess, a pin adapted to ride in the said diametral grooves, a cable attached to the said pin, a pair of mirrors fixed to the said sleeves, and means under control of the driver of the vehicle for exerting tension on the cable to raise the arm and to rotate the sleeves and their respective mirrors in opposed directions to bring the mirrors into view, and to exert pressure on the said cable to move the mirrors and the arm in opposite directions.

3. A reflecting device for motor vehicles, comprising an arm, means pivotally mounting said arm on a vehicle for pivotal movement to and from an operative and an inoperative position, said arm including a free end formed with an axially-disposed cylindrical recess therein, a sleeve rotatable within said recess relative to said arm, a mirror fixed to said sleeve, means operable by an occupant of said vehicle for swinging said arm to and from said operative and inoperative positions, and said means including means for rotating said sleeve relative to said arm to vary the angle of reflection of said mirror.

4. A reflecting device for motor vehicles, comprising an arm, means pivotally mounting said arm to a forward portion of a vehicle for movement to and from an operative and an inoperative position, said arm including a free end formed with an axially-disposed cylindrical recess therein, an inner cylindrical sleeve and an outer cylindrical sleeve nested within said recess for pivotal movement relative thereto and to each other, each of said sleeves being formed with a helical diametral groove, the groove of one sleeve being a left-hand helix and that of the other sleeve being a right-hand helix, a diametral pin adapted to ride in said grooves of both sleeves, a mirror fixed to each sleeve, a cable connected to said pin, said cable including a free end disposed inwardly of said vehicle for actuation in both axial directions by an occupant of said vehicle, and said cable being operative upon axial movement thereof to swing said arm pivotally into and out of said operative position, and said cable comprising means for moving said pin axially of said arm whereby to rotate said sleeves and said mirrors relative to said arm in opposite directions to simultaneously vary the angles of reflection of both mirrors.

5. A reflecting device for motor vehicles, comprising a bracket adapted to be secured to a forward portion of a vehicle, an arm including an inner end, a pivot pivotally connecting said inner end of said arm to said bracket for pivotal movement relative thereto into and out of an operative and an inoperative position, said arm including a free end, a pair of folding mirrors, separate pivot means individually pivoting said mirrors to said free end of said arm for individual pivotal movement relative thereto and to each other about the axis of said arm substantially at right angles to said first pivot whereby to vary the angle of reflection of said mirrors, said arm and bracket being formed with a continuous passageway therethrough, a cable extensible through said passageway, said cable including a free end disposed inwardly of said vehicle for actuation axially in both directions by an occupant of said vehicle, and axial movement of said cable being operative to swing said arm into and out of said operative position and also to pivotally move said mirrors relative to said arm to vary the angles of reflection thereof.

VORIS V. PRICE.

REFERENCES CITED

The following references are of record in the file of this patent:

UNITED STATES PATENTS

| Number | Name | Date |
| --- | --- | --- |
| 112,474 | Mason | Mar. 7, 1871 |
| 1,717,536 | Williams | June 18, 1929 |
| 1,740,909 | Shaw | Dec. 24, 1929 |
| 1,902,037 | Loeffler | Mar. 21, 1933 |

FOREIGN PATENTS

| Number | Country | Date |
| --- | --- | --- |
| 488,652 | Germany | Jan. 4, 1930 |